US011439919B2

(12) United States Patent
Trombetta et al.

(10) Patent No.: US 11,439,919 B2
(45) Date of Patent: Sep. 13, 2022

(54) INTEGRATING COMMENTARY CONTENT AND GAMEPLAY CONTENT OVER A MULTI-USER PLATFORM (71) Applicant: SONY INTERACTIVE ENTERTAINMENT LLC, San Mateo, CA (US)

(72) Inventors: Steven Trombetta, San Mateo, CA (US); Christopher Thielbar, San Francisco, CA (US); James Fairbairn, Novato, CA (US)

(73) Assignee: SONY INTERACTIVE ENTERTAINMENT LLC ( * ) Notice: Subject to any disclaimer, the term of this patent is extended or adjusted under 35 U.S.C. 154(b) by 0 days.

(21) Appl. No.: 17/014,149

(22) Filed: Sep. 8, 2020

(65) Prior Publication Data
US 2020/0398169 A1 Dec. 24, 2020

Related U.S. Application Data (63) Continuation of application No. 15/908,531, filed on Feb. 28, 2018, now Pat. No. 10,765,957.

(51) Int. Cl.
A63F 13/33 (2014.01)
A63F 13/87 (2014.01)
(Continued)

(52) U.S. Cl.
CPC ............ A63F 13/87 (2014.09); A63F 13/798 (2014.09); A63F 13/86 (2014.09); H04L 67/38 (2013.01);
(Continued)

(58) Field of Classification Search
CPC ........ A63F 13/87; A63F 13/798; A63F 13/86; A63F 13/32; A63F 13/33;
(Continued)

(56) References Cited

U.S. PATENT DOCUMENTS 5,729,471 A 3/1998 Jain et al.
5,995,518 A 11/1999 Burns et al.
(Continued)

FOREIGN PATENT DOCUMENTS

CN 110201395 A 9/2019
CN 110201398 A 9/2019
(Continued)

OTHER PUBLICATIONS

U.S. Appl. No. 15/448,356 Final Office Action dated Jul. 28, 2021.
(Continued)

Primary Examiner — Omkar A Deodhar
Assistant Examiner — Shauna-Kay Hall
(74) Attorney, Agent, or Firm — Polsinelli LLP (57) ABSTRACT A multi-user platform provides an immersive digital (including virtual reality (VR)) environment to solicit and broadcast commentary related to gameplay. The multi-user platform receives gameplay content, which includes a plurality of media streams that show one or more views. The multi-user platform generates a graphical representation for each media stream in the VR environment, receives commentary content corresponding to one or more media streams in the VR environment, and determines one graphical representation for one media stream is an active representation in the VR environment for a time period. The multi-user platform further synchronizes a portion of the commentary content received in the time period with the one media stream associated with the active representation to create synchronized content and broadcast gameplay channel(s) that includes the synchronized content to one or more subscribers connected to the multi-user platform.

18 Claims, 9 Drawing Sheets (51) Int. Cl.
*H04L 67/131* (2022.01)
*H04N 21/43* (2011.01)
*H04N 21/4788* (2011.01)
*H04N 21/44* (2011.01)
*A63F 13/86* (2014.01)
*A63F 13/798* (2014.01)
*A63F 13/32* (2014.01)

(52) U.S. Cl.
CPC ......... *H04N 21/4302* (2013.01); *H04N 21/44* (2013.01); *H04N 21/4788* (2013.01); *A63F 13/32* (2014.09); *A63F 13/33* (2014.09); *A63F 2300/558* (2013.01); *A63F 2300/572* (2013.01); *A63F 2300/577* (2013.01); *A63F 2300/8082* (2013.01)

(58) Field of Classification Search
CPC .......... A63F 2300/558; A63F 2300/572; A63F 2300/577; A63F 2300/8082
See application file for complete search history.

(56) References Cited

U.S. PATENT DOCUMENTS

| | | |
|---|---|---|
| 6,415,317 B1 | 7/2002 | Yelon et al. |
| 6,546,421 B1 | 4/2003 | Wynblatt et al. |
| 6,631,522 B1 | 10/2003 | Erdelyi |
| 6,877,134 B1 | 4/2005 | Fuller et al. |
| 7,499,475 B2 | 3/2009 | Kashiwagi et al. |
| 8,025,572 B2 | 9/2011 | Spanton et al. |
| 8,187,104 B2 | 5/2012 | Pearce |
| 8,202,167 B2 | 6/2012 | Ackely et al. |
| 8,645,844 B1 | 2/2014 | Strobel et al. |
| 9,233,305 B2 | 1/2016 | Laakkonen et al. |
| 9,433,855 B1 | 9/2016 | Keeker et al. |
| 9,473,825 B2 | 10/2016 | Gossweiler et al. |
| 9,497,424 B2 | 11/2016 | Kosseifi et al. |
| 9,782,678 B2 | 10/2017 | Long et al. |
| 9,814,987 B1 | 11/2017 | Lawson |
| 9,860,477 B2 | 1/2018 | Kummer et al. |
| 9,871,997 B2 | 1/2018 | Kosseifi et al. |
| 9,968,856 B1 | 5/2018 | Ninoles et al. |
| 10,277,813 B1 | 4/2019 | Thomas et al. |
| 10,471,360 B2 | 11/2019 | Trombetta |
| 10,751,623 B2 | 8/2020 | Trombetta |
| 10,765,938 B2 | 9/2020 | Trombetta |
| 10,765,957 B2 | 9/2020 | Trombetta |
| 10,792,576 B2 | 10/2020 | Trombetta |
| 10,792,577 B2 | 10/2020 | Trombetta |
| 10,814,228 B2 | 10/2020 | Trombetta |
| 10,818,142 B2 | 10/2020 | Trombetta |
| 10,953,322 B2 | 3/2021 | Trombetta |
| 10,953,335 B2 | 3/2021 | Thielbar |
| 11,065,548 B2 | 7/2021 | Trombetta |
| 11,241,630 B2 | 2/2022 | Trombetta |
| 2002/0034980 A1 | 3/2002 | Lemmons et al. |
| 2002/0107040 A1 | 8/2002 | Crandall et al. |
| 2003/0177347 A1 | 9/2003 | Schneier et al. |
| 2003/0220143 A1 | 11/2003 | Shteyn et al. |
| 2004/0147306 A1 | 7/2004 | Randall et al. |
| 2004/0189701 A1 | 9/2004 | Badt |
| 2004/0257994 A1 | 12/2004 | Paskett et al. |
| 2004/0266535 A1 | 12/2004 | Reeves |
| 2005/0020359 A1 | 1/2005 | Ackley et al. |
| 2005/0026699 A1 | 2/2005 | Kinzer et al. |
| 2006/0105827 A1 | 5/2006 | Metzger et al. |
| 2006/0247060 A1 | 11/2006 | Hanson et al. |
| 2006/0287096 A1 | 12/2006 | O'Kelley et al. |
| 2007/0018952 A1 | 1/2007 | Arseneau et al. |
| 2007/0021058 A1 | 1/2007 | Aresneau et al. |
| 2007/0070914 A1 | 3/2007 | Abigail |
| 2007/0117617 A1 | 5/2007 | Spanton et al. |
| 2007/0117635 A1 | 5/2007 | Spanton et al. |
| 2007/0149288 A1 | 6/2007 | Nickell et al. |
| 2007/0248261 A1 | 10/2007 | Zhou et al. |
| 2008/0079752 A1 | 4/2008 | Gates et al. |
| 2008/0113815 A1 | 5/2008 | Weingardt et al. |
| 2008/0119286 A1 | 5/2008 | Brunstetter et al. |
| 2008/0200254 A1 | 8/2008 | Cayce et al. |
| 2009/0036214 A1 | 2/2009 | Dahl |
| 2009/0042646 A1 | 2/2009 | Sarkar et al. |
| 2009/0082110 A1 | 3/2009 | Relyea et al. |
| 2009/0144448 A1 | 6/2009 | Smith |
| 2009/0208181 A1 | 8/2009 | Cottrell |
| 2009/0225828 A1 | 9/2009 | Perlman et al. |
| 2009/0271821 A1 | 10/2009 | Zalewski |
| 2010/0099330 A1 | 4/2010 | Digiovanni |
| 2010/0100512 A1 | 4/2010 | Brodin et al. |
| 2010/0240443 A1 | 9/2010 | Baerlocher et al. |
| 2011/0092282 A1 | 4/2011 | Gary |
| 2011/0207523 A1 | 8/2011 | Filipour et al. |
| 2011/0250939 A1 | 10/2011 | Hobler |
| 2011/0263332 A1 | 10/2011 | Mizrachi |
| 2011/0263333 A1 | 10/2011 | Dokei et al. |
| 2011/0275431 A1 | 11/2011 | Hirzel et al. |
| 2012/0093481 A1 | 4/2012 | McDowell et al. |
| 2012/0142411 A1 | 6/2012 | Thompson et al. |
| 2012/0283017 A1 | 11/2012 | Ahiska et al. |
| 2013/0002949 A1 | 1/2013 | Raveendran et al. |
| 2013/0007013 A1 | 1/2013 | Geisner et al. |
| 2013/0083173 A1 | 4/2013 | Geisner et al. |
| 2013/0123019 A1 | 5/2013 | Sullivan et al. |
| 2013/0231189 A1 | 9/2013 | Beeler |
| 2013/0254680 A1 | 9/2013 | Buhr et al. |
| 2013/0296051 A1 | 11/2013 | Gault et al. |
| 2013/0324239 A1 | 12/2013 | Ur et al. |
| 2014/0004951 A1 | 1/2014 | Kern et al. |
| 2014/0031121 A1 | 1/2014 | Kern et al. |
| 2014/0087846 A1 | 3/2014 | Bryan et al. |
| 2014/0087851 A1 | 3/2014 | Low et al. |
| 2014/0113718 A1 | 4/2014 | Norman et al. |
| 2014/0142921 A1 | 5/2014 | Gleadall et al. |
| 2014/0171039 A1 | 6/2014 | Bjontegard |
| 2014/0171182 A1 | 6/2014 | Versaci |
| 2014/0179440 A1 | 6/2014 | Perry |
| 2014/0228112 A1 | 8/2014 | Laakkonen et al. |
| 2014/0274307 A1 | 9/2014 | Gonzalez |
| 2014/0274368 A1 | 9/2014 | Cotter |
| 2014/0274370 A1 | 9/2014 | Shah |
| 2014/0297408 A1 | 10/2014 | Zabala |
| 2014/0331265 A1 | 11/2014 | Mozell et al. |
| 2015/0005052 A1 | 1/2015 | Harrington et al. |
| 2015/0011283 A1 | 1/2015 | Sanford et al. |
| 2015/0018990 A1 | 1/2015 | Shachar et al. |
| 2015/0024850 A1 | 1/2015 | Kokami et al. |
| 2015/0113548 A1 | 4/2015 | Stern et al. |
| 2015/0141140 A1 | 5/2015 | Lampe et al. |
| 2015/0238859 A1 | 8/2015 | Fear |
| 2015/0248792 A1 | 9/2015 | Abovitz et al. |
| 2015/0281029 A1 | 10/2015 | Callahan et al. |
| 2015/0348373 A1 | 12/2015 | Weingardt et al. |
| 2015/0375117 A1 | 12/2015 | Thompson et al. |
| 2016/0051895 A1 | 2/2016 | Hood |
| 2016/0193530 A1 | 7/2016 | Parker et al. |
| 2016/0214012 A1 | 7/2016 | Nishikawa |
| 2016/0243450 A1 | 8/2016 | Cotter |
| 2016/0253865 A1 | 9/2016 | Men et al. |
| 2016/0286244 A1 | 9/2016 | Chang et al. |
| 2016/0310843 A1 | 10/2016 | Webb |
| 2016/0365121 A1 | 12/2016 | DeCaprio |
| 2016/0373499 A1 | 12/2016 | Wagner et al. |
| 2017/0001111 A1 | 1/2017 | Willette et al. |
| 2017/0001112 A1 | 1/2017 | Gilmore et al. |
| 2017/0003740 A1 | 1/2017 | Verfaillie et al. |
| 2017/0003784 A1 | 1/2017 | Garg et al. |
| 2017/0006074 A1 | 1/2017 | Oates |
| 2017/0072324 A1 | 3/2017 | Navok et al. |
| 2017/0113143 A1 | 4/2017 | Marr |
| 2017/0157512 A1 | 6/2017 | Long et al. |
| 2017/0182426 A1 | 6/2017 | Loeb et al. |
| 2017/0209795 A1 | 7/2017 | Harvey et al. |
| 2017/0266549 A1 | 9/2017 | Paradise |
| 2017/0266552 A1 | 9/2017 | Paradise et al. |
| 2017/0270751 A1 | 9/2017 | Paradise |

(56) References Cited

U.S. PATENT DOCUMENTS

| | | | |
|---|---|---|---|
| 2017/0282075 A1 | 10/2017 | Michot et al. | |
| 2017/0304724 A1 | 10/2017 | Cotter | |
| 2017/0332131 A1* | 11/2017 | Opsenica | H04L 43/04 |
| 2017/0354875 A1 | 12/2017 | Marks et al. | |
| 2017/0374402 A1 | 12/2017 | Pogorelik et al. | |
| 2018/0001199 A1 | 1/2018 | Gary | |
| 2018/0077438 A1 | 3/2018 | Hensen et al. | |
| 2018/0139257 A1 | 5/2018 | Ninoles et al. | |
| 2018/0167656 A1 | 6/2018 | Ortiz et al. | |
| 2018/0192144 A1 | 7/2018 | McElroy | |
| 2018/0250598 A1 | 9/2018 | Trombetta | |
| 2018/0250600 A1 | 9/2018 | Trombetta | |
| 2018/0367820 A1 | 12/2018 | Abulikemu | |
| 2019/0099675 A1 | 4/2019 | Khan et al. | |
| 2019/0102941 A1 | 4/2019 | Khan et al. | |
| 2019/0118098 A1 | 4/2019 | Payzer et al. | |
| 2019/0262705 A1 | 8/2019 | Trombetta | |
| 2019/0262706 A1 | 8/2019 | Trombetta | |
| 2019/0262712 A1 | 8/2019 | Trombetta | |
| 2019/0262713 A1 | 8/2019 | Trombetta | |
| 2019/0262717 A1 | 8/2019 | Thielbar | |
| 2019/0262720 A1 | 8/2019 | Trombetta | |
| 2019/0262723 A1 | 8/2019 | Trombetta | |
| 2019/0262724 A1 | 8/2019 | Trombetta | |
| 2019/0262727 A1 | 8/2019 | Trombetta | |
| 2019/0266845 A1 | 8/2019 | Trombetta | |
| 2020/0179812 A1 | 6/2020 | Trombetta | |
| 2020/0384364 A1 | 12/2020 | Trombetta | |
| 2020/0398157 A1 | 12/2020 | Trombetta | |
| 2020/0406152 A1 | 12/2020 | Trombetta | |
| 2021/0016190 A1 | 1/2021 | Trombetta | |
| 2021/0043044 A1 | 2/2021 | Trombetta | |
| 2021/0052982 A1 | 2/2021 | Trombetta | |
| 2021/0178257 A1 | 6/2021 | Trombetta | |
| 2021/0205711 A1 | 7/2021 | Thielbar | |
| 2021/0346809 A1 | 11/2021 | Trombetta | |

FOREIGN PATENT DOCUMENTS

| | | |
|---|---|---|
| CN | 110201399 A | 9/2019 |
| CN | 110201401 A | 9/2019 |
| CN | 110201402 A | 9/2019 |
| CN | 110201404 A | 9/2019 |
| CN | 110573221 A | 12/2019 |
| CN | 111971097 A | 11/2020 |
| CN | 112423854 A | 2/2021 |
| CN | 112423855 A | 2/2021 |
| CN | 112543669 A | 3/2021 |
| EP | 3 058 996 | 8/2016 |
| EP | 3 758 814 | 1/2021 |
| EP | 3 758 816 | 1/2021 |
| EP | 3 758 818 | 1/2021 |
| EP | 3 758 819 | 1/2021 |
| EP | 3 758 821 | 1/2021 |
| EP | 3 759 930 | 1/2021 |
| EP | 3 759 934 | 1/2021 |
| EP | 3 758 820 | 2/2021 |
| JP | 2021-514748 | 6/2021 |
| JP | 2021-514749 | 6/2021 |
| JP | 2021-514750 | 6/2021 |
| JP | 2021-514751 | 6/2021 |
| JP | 2021-514752 | 6/2021 |
| JP | 2021-514753 | 6/2021 |
| JP | 2021-514754 | 6/2021 |
| JP | 2021-515485 | 6/2021 |
| JP | 2021-516087 | 7/2021 |
| JP | 2021-516088 | 7/2021 |
| KR | 10-2020-0126975 | 11/2020 |
| KR | 10-2020-0127169 | 11/2020 |
| KR | 10-2020-0127172 | 11/2020 |
| KR | 10-2020-0127173 | 11/2020 |
| KR | 10-2020-0128523 | 11/2020 |
| KR | 10-2020-0135946 | 12/2020 |
| KR | 10-2020-0136894 | 12/2020 |
| WO | WO 2010/030313 | 3/2010 |
| WO | WO 2014/109435 | 7/2014 |
| WO | WO 2016/048204 | 3/2016 |
| WO | WO 2016/201333 | 12/2016 |
| WO | WO 2017/004433 | 1/2017 |
| WO | WO 2018/004812 | 1/2018 |
| WO | WO 2018/160274 | 9/2018 |
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

Application No. 18763374.8, Extended European Search Report dated Dec. 14, 2020.
U.S. Appl. No. 16/681,477 Final Office Action dated Nov. 30, 2020.
Application No. 19761465.4 Extended European Search Report dated Sep. 1, 2021.
Application No. 19761341.7 Extended European Search Report dated Aug. 17, 2021.
Application No. 19761523.0 Extended European Search Report dated Aug. 12, 2021.
Application No. 202027037125 First Examination Report dated Aug. 5, 2021.
Application No. 19760493.7 Extended European Search Report dated Sep. 2, 2021.
U.S. Appl. No. 15/448,356 Office Action dated Apr. 12, 2021.
U.S. Appl. No. 16/681,477 Office Action dated Mar. 19, 2021.
U.S. Appl. No. 17/380,373, Steven Trombetta, Statistical Driven Tournaments, filed Jul. 20, 2021.
U.S. Appl. No. 17/207,679, Christopher Thielbar, Online Tournament Integration, filed Mar. 21, 2021.
U.S. Appl. No. 17/188,544, Steven Trombetta, Scaled Engagement and Views in an E-Sports Event, filed Mar. 1, 2021.
NAHL ranked #1 by The Junior Hockey News_North American Hockey League_NAHL.pdf, http://nahl.com/news/story.cfm?id=15090, Jul. 16, 2015 (Year: 2015).
PCT Application No. PCT/US2018/013378 International Preliminary Report On Patentability dated Sep. 3, 2019.
PCT Application No. PCT/US2018/013378 International Search Report and Written Opinion dated Mar. 8, 2018.
PCT Application No. PCT/US2018/021197 International Preliminary Report on Patentability dated Sep. 10, 2020.
PCT Application No. PCT/US2018/021197 International Search Report and Written Opinion dated May 30, 2018.
PCT Application No. PCT/US2019/015120 International Preliminary Report on Patentability dated Sep. 1, 2020.
PCT Application No. PCT/US2019/015120 International Search Report and Written Opinion dated Apr. 15, 2019.
PCT Application No. PCT/US2019/015273 International Preliminary Report on Patentability dated Sep. 1, 2020.
PCT Application No. PCT/US2019/015273 International Search Report and Written Opinion dated Apr. 23, 2019.
PCT Application No. PCT/US2019/015124 International Preliminary Report on Patentability dated Sep. 1, 2020.
PCT Application No. PCT/US2019/015124 International Search Report and Written Opinion dated Apr. 15, 2019.
PCT Application No. PCT/US2019/015275 International Preliminary Report on Patentability dated Sep. 1, 2020.
PCT Application No. PCT/US2019/015275 International Search Report and Written Opinion dated Apr. 23, 2019.
PCT Application No. PCT/US2019/016167 International Preliminary Report on Patentability dated Sep. 1, 2020.
PCT Application No. PCT/US2019/016167 International Search Report and Written Opinion dated Aug. 26, 2019.

(56) References Cited

OTHER PUBLICATIONS

PCT Application No. PCT/US2019/016180 International Preliminary Report on Patentability dated Sep. 1, 2020.
PCT Application No. PCT/US2019/016180 International Search Report and Written Opinion dated Apr. 23, 2019.
PCT Application No. PCT/US2019/016686 International Preliminary Report on Patentability dated Sep. 1, 2020.
PCT Application No. PCT/US2019/016686 International Search Report and Written Opinion dated Apr. 10, 2019.
PCT Application No. PCT/US2019/016698 International Preliminary Report on Patentability dated Sep. 1, 2020.
PCT Application No. PCT/US2019/016698 International Search Report and Written Opinion dated Apr. 11, 2019.
PCT Application No. PCT/US2019/016694 International Preliminary Report on Patentability dated Sep. 1, 2020.
PCT Application No. PCT/US2019/016694 International Search Report and Written Opinion dated Apr. 15, 2019.
PCT Application No. PCT/US2019/017100 International Preliminary Report on Patentability dated Sep. 1, 2020.
PCT Application No. PCT/US2019/017100 International Search Report and Written Opinion dated Apr. 17, 2019.
U.S. Appl. No. 15/448,356 Final Office Action dated Oct. 21, 2020.
U.S. Appl. No. 15/448,356 Office Action dated May 28, 2020.
U.S. Appl. No. 15/448,356 Final Office Action dated Aug. 6, 2019.
U.S. Appl. No. 15/448,356 Office Action dated Jan. 8, 2019.
U.S. Appl. No. 15/448,356 Final Office Action dated Aug. 31, 2018.
U.S. Appl. No. 15/448,356 Office Action dated Mar. 5, 2018.
U.S. Appl. No. 15/450,602 Final Office Action dated Nov. 2, 2018.
U.S. Appl. No. 15/450,602 Office Action dated Apr. 6, 2018.
U.S. Appl. No. 16/681,477 Office Action dated Apr. 16, 2020.
U.S. Appl. No. 15/908,569 Office Action dated Mar. 27, 2020.
U.S. Appl. No. 15/908,569 Office Action dated Jun. 28, 2019.
U.S. Appl. No. 15/908,722 Office Action dated Oct. 30, 2020.
U.S. Appl. No. 15/908,722 Final Office Action dated Jun. 12, 2020.
U.S. Appl. No. 15/908,722 Office Action dated Jun. 28, 2019.
U.S. Appl. No. 15/908,635 Office Action dated Jun. 28, 2019.
U.S. Appl. No. 15/908,531 Office Action dated Jun. 28, 2019.
U.S. Appl. No. 15/908,657 Office Action dated Jun. 28, 2019.
U.S. Appl. No. 15/908,438 Office Action dated Oct. 3, 2019.
U.S. Appl. No. 15/908,345 Office Action dated Jan. 10, 2020.
U.S. Appl. No. 15/908,704 Final Office Action dated Jun. 12, 2020.
U.S. Appl. No. 15/908,704 Office Action dated Jun. 28, 2019.
U.S. Appl. No. 15/908,712 Office Action dated Aug. 8, 2019.
U.S. Appl. No. 15/908,707 Final Office Action dated Nov. 18, 2019.
U.S. Appl. No. 15/908,707 Office Action dated Jul. 17, 2019.
Application No. 19760240.2 Extended European Search Report dated Feb. 2, 2022.
Application No. 202027037244 First Examination Report dated Dec. 15, 2021.
U.S. Appl. No. 17/014,182 Office Action dated Sep. 29, 2021.
U.S. Appl. No. 17/000,841 Office Action dated Sep. 20, 2021.
U.S. Appl. No. 17/015,845 Office Action dated Oct. 6, 2021.
U.S. Appl. No. 17/060,458 Office Action dated Oct. 6, 2021.
Dietrich et al., Carlos; "Baseball4D: A tool for baseball game reconstruction & visualization", 2014 IEEE Conference on Visual Analytics Science and Technology (VAST), IEEE, Oct. 25, 2014, pp. 23-32.
Application No. 19760732.8 Extended European Search Report dated Oct. 1, 2021.
Application No. 10-2019-7029332 Office Action dated Oct. 19, 2021.
Application No. 19760888.8 Extended European Search Report dated Oct. 27, 2021.
Application No. 19760016.6 Extended European Search Report dated Oct. 8, 2021.
Application No. 19759929.3 Extended European Search Report dated Oct. 25, 2021.
Application No. 19760240.2 Partial Supplementary European Search Report dated Oct. 13, 2021.
Application No. 19760890.4 Extended European Search Report dated Nov. 10, 2021.
U.S. Appl. No. 17/080,551 Office Action dated May 12, 2022.
U.S. Appl. No. 17/188,544 Office Action dated Jun. 27, 2022.
U.S. Appl. No. 17/080,580 Office Action dated May 26, 2022.

\* cited by examiner

INTEGRATING COMMENTARY CONTENT AND GAMEPLAY CONTENT OVER A MULTI-USER PLATFORM

CROSS-REFERENCE TO RELATED APPLICATION

The present application is a continuation and claims the priority benefit of U.S. patent application Ser. No. 15/908,531 filed Feb. 28, 2018, now U.S. Pat. No. 10,765,957, which is incorporated herein by reference in its entirety.

BACKGROUND OF THE INVENTION

Field of the Invention

The present disclosure generally relates to online gameplay hosted by multi-user platforms, and more particularly to interfaces for providing spectator commentary and integrating commentary with gameplay.

Description of the Related Art

Technological advances gave rise to our modern information age and facilitated an explosion of easily and readily accessible content, particularly streaming content (e.g., multimedia content) over multi-user platforms. These multi-user platforms, in turn, support an ever-increasing consumer base of spectators and players who engage or otherwise participate in online gameplay. Because of this popularity, there is substantial interest in improving spectator experiences.

However, creating spectator experiences similar to spectating conventional sporting events present new challenges due to the inherently online nature of such gameplay. For example, while traditional sporting events typically involve a physical meeting of teams on a shared field and broadcast licensing between specified parties, online gameplay is often hosted over multi-user platforms, which allow players (and spectators) from anywhere in the world to connect and interact within a virtual environment of a game. In addition, online gameplay often involves more nuanced and complex media content (as compared to conventional sporting events), including a large number of viewing angles, different point systems, graphical renderings, and the like. Further, current distribution models to broadcast online game play in conjunction with spectator-generated content (e.g., commentary content) often require license agreements, which hinder real-time commentary of live online gameplay.

Therefore, there is a need in the art for improved spectator experiences, including integrating commentary and gameplay over a multi-user platform.

SUMMARY OF THE PRESENTLY CLAIMED INVENTION

In one exemplary embodiment, this disclosure describes a method for providing commentary related to gameplay. The method includes steps to receive gameplay content for a game session hosted by a multi-user platform. Notably, the gameplay content includes a plurality of media streams that can show different views of the gameplay. The method further generates graphical representations for each media stream in a digital environment (e.g., display screens presented in a simulated commentator studio/video editing studio) as well as receives commentary content corresponding to a media stream (or portions thereof). In particular, the method determines one of the graphical representations (or a simulated VR display screen) is an active representation for a time period and synchronizes a portion of the commentary content received in the time period with a portion of the media stream associated with the active representation for the same time period. The method further broadcasts a gameplay channel that includes the synchronized content to one or more subscribers connected to the multi-user platform.

In another embodiment, this disclosure provides a multi-user system for providing commentary related to gameplay. The multi-user system includes a network interface to communicate in a communication network, a processor coupled to the network interface and adapted to execute one or more processes, and a memory configured to store a process executable by the processor. The process, when executed, is operable to receive gameplay content for a game session (e.g., hosted by a multi-user platform). Notably, the gameplay content includes a plurality of media streams that show one or more views. The process is further operable to generate a graphical representation for each media stream in a digital environment (e.g., a simulated display screen) and receive commentary content corresponding to one or more media streams (or portions thereof). The process also determines a graphical representation for a media stream is an active representation for a time period in the digital environment. In addition, the process synchronizes a portion of the commentary content (e.g., received in the same time period) with a portion of the media stream associated with the active representation for the time period to create synchronized content. The process further broadcasts a gameplay channel that includes the synchronized content to one or more subscribers connected to the multi-user system.

In yet another embodiment, this disclosure provides a tangible, non-transitory, computer-readable media that includes software or instructions such as an exemplary commentator process. The software/instructions are executed by a processor, which causes the processor to receive gameplay content hosted by a multi-user platform. Notably, the gameplay content includes a plurality of media streams that show one or more views. The commentator process also generates graphical representations (e.g., simulated display screens) for each media stream in a digital environment and receives commentary content corresponding the media streams (or portions thereof). The commentator process further determines a graphical representation is an active representation for a time period in the digital environment and synchronizes a portion of the commentary content (received in the time period) with the one media stream associated with the active representation for the time period to create synchronized content. The commentator process also broadcasts a gameplay channel that includes the synchronized content to one or more subscribers connected to the multi-user platform.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein, the term "user" refers to a user of an electronic device(s) and can include participants or players, as well as non-participants or spectators. Actions performed by a user in the context of computer software shall be considered to be actions taken by a user to provide an input to the electronic device(s) to cause the electronic device to perform the steps embodied in computer software. The terms "stream" or "media stream" are synonymous and generally refer to data or content associated with an online game or an online game session.

As discussed in herein, the subject disclosure generally relates to online gameplay hosted by multi-user platforms and improving spectator experiences. In particular, the techniques disclosed herein integrate and synchronize commentary content an gameplay content and broadcast such content to subscribers of the multi-user platform.

Figure 1:
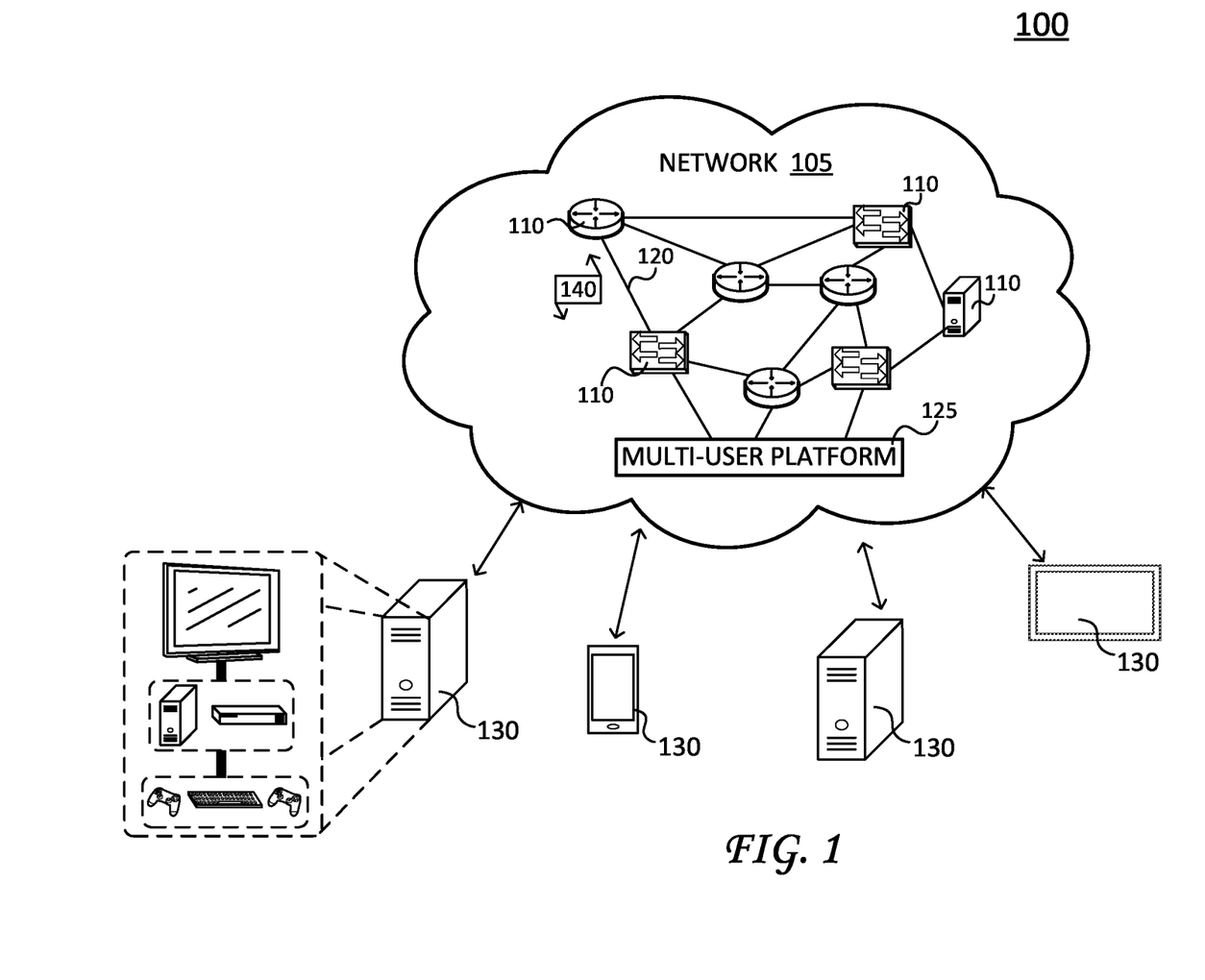
FIG. 1 illustrates a schematic diagram of an example communication network, including a multi-user platform.

Referring to the figures, FIG. 1 illustrates a schematic diagram 100 of an example communication network 105 (e.g., the Internet). Communication network 105 is shown for purposes of illustration and represents various types of networks, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Communication network 105 includes a geographically distributed collection of devices or nodes 110, interconnected by communication links 120 for exchanging data such as data packets 140 and for transporting data to end nodes or client devices 130 through a multi-user platform 125. In particular, multi-user platform 125 distributes or broadcasts multi-media content (e.g., audio content, visual content, textual content, etc.) to end nodes or client devices 130. Client devices 130 include personal computing devices, online game systems, laptops, tablets, mobile devices, or other devices as is appreciated by those skilled in the art. Notably, one client device 130 represents a network game system, which includes a game console, peripheral devices, and display hardware. Operatively, a user can subscribe client device 130 to multi-user platform 125 and play, spectate, or otherwise access online media content hosted by multi-user platform 125.

Further, communication links 120 represent wired links or shared media links (e.g., wireless links, PLC links, etc.) where certain devices, such as, e.g., routers, servers, switches, sensors, computers, etc., may be in communication with other devices, based on distance, signal strength, current operational status, location, etc. Those skilled in the art will understand that any number of nodes, devices, links, etc. may be used in the communication network, and that the view shown herein is for simplicity.

Data packets 140 such as network traffic/messages are exchanged between devices over and within communication network 105 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the devices or nodes interact with each other.

Figure 2:
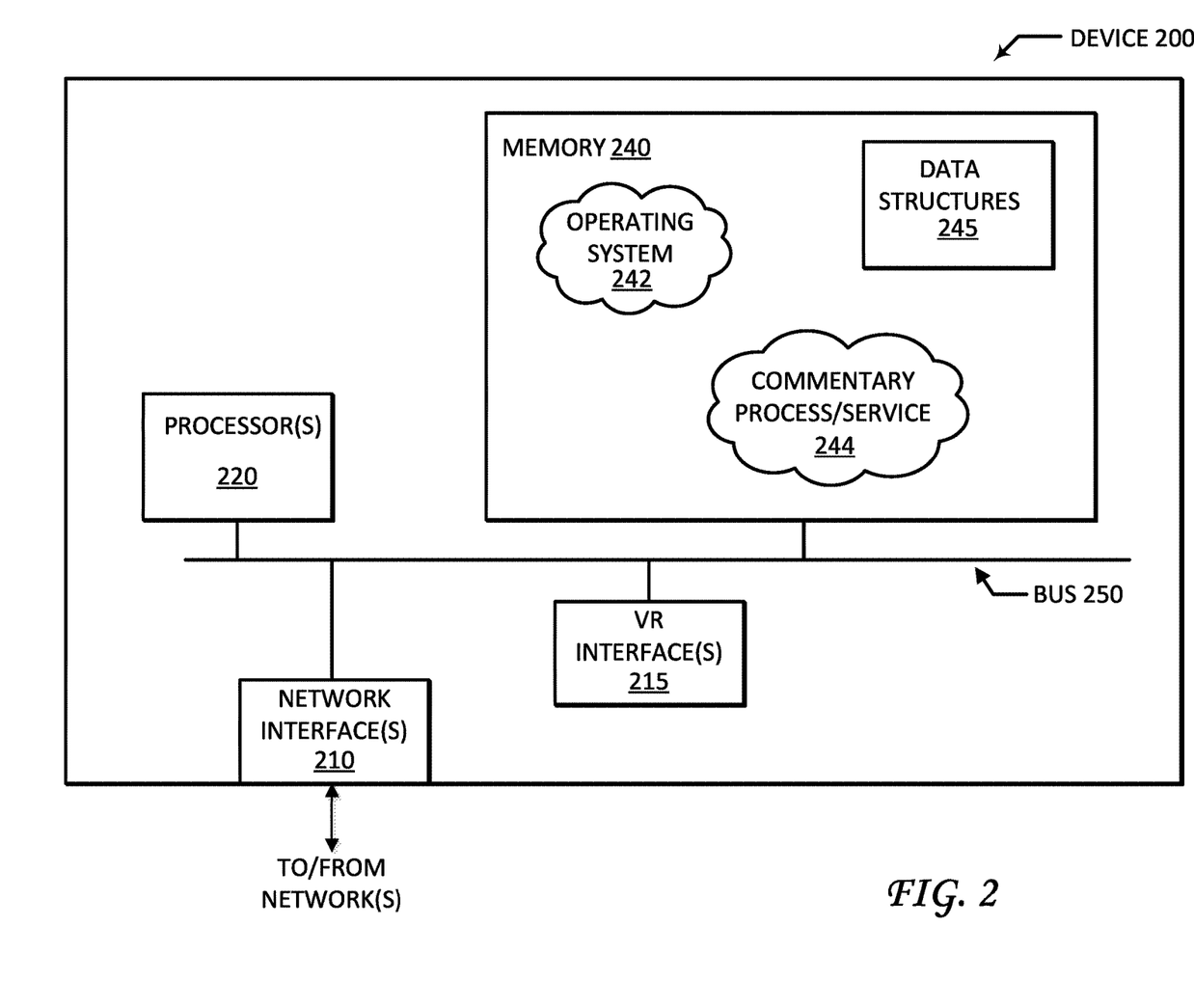
FIG. 2 illustrates a block diagram of an example device/node that can be used in conjunction with the multi-user platform shown in FIG. 1.

FIG. 2 illustrates a block diagram of an example network device 200 that represents multi-user platform 125 (or components thereof). Device 200 includes one or more network interfaces 210, a user input interface 215, at least one processor 220, and a memory 240 interconnected by a system bus 250.

Network interface(s) 210 contain the mechanical, electrical, and signaling circuitry for communicating data over links coupled to one or more of the networks shown in schematic diagram 100. Network interfaces 210 are configured to transmit and/or receive data using a variety of different communication protocols, as will be understood by those skilled in the art.

User input interfaces 215 may be inclusive of any variety of user interface known in the art for receiving different types of user input, including at least handheld controllers, portable controllers, keyboards, keypads, touchscreens, cameras, game peripherals and accessories, etc. Some interfaces 215 may be specific to virtual reality (VR) environments. Virtual reality (VR) interface(s) 215 provide interactive graphical interfaces to solicit and receive user input corresponding to gameplay content in a VR environment. For example, VR interface 215 may include any number of menus, boxes, buttons, editor interfaces, drawing tools, playback tools, selectable elements, graphical icons, and the like. These graphical interfaces can be manipulated by a user to provide commentary for a game session as discussed in greater detail below.

Memory 240 comprises a plurality of storage locations that are addressable by processor 220 for storing software programs and data structures associated with the embodiments described herein.

Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of software processes and/or services executing on the device. These software processes and/or services may comprise an illustrative "commentary" process/service 244. Note that while processes/services 244 are shown in centralized memory 240, these processes/services may be configured to operate in a distributed communication network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having commentary process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3:
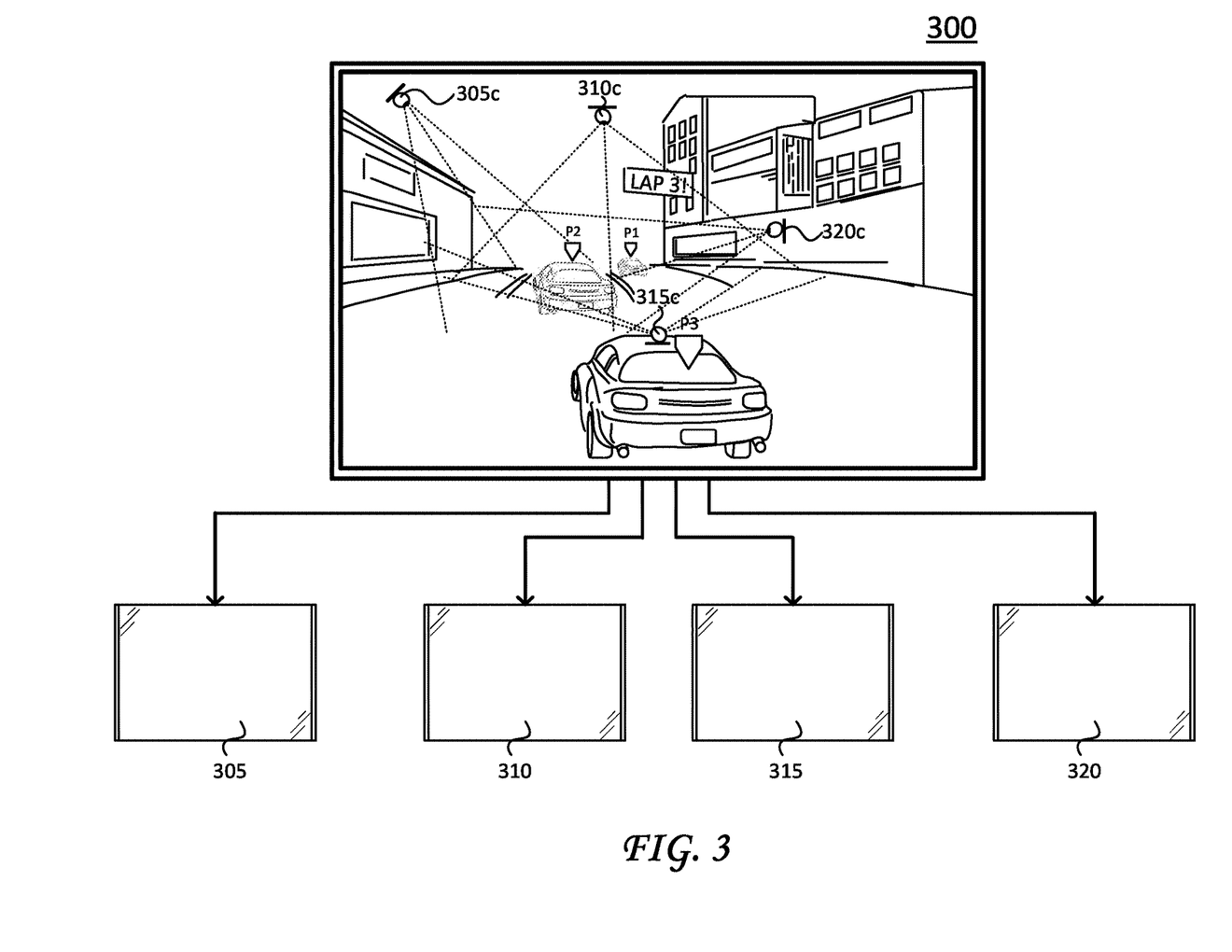
FIG. 3 illustrates a schematic diagram representing gameplay content for a game session.

FIG. 3 illustrates a schematic diagram 300 representing gameplay content for a game session. The game session may be hosted by multi-user platform 125 (discussed above) and accessible by any number of subscribers (e.g., players, spectators, etc.). As illustrated, the gameplay content relates to a car racing tournament, which can be viewed by a number of cameras—camera 305c, camera 310c, camera 315c, camera 320c, and etc. Cameras 305c, 310c, 315c, and 320c are shown for purposes of illustration and may (or may not) be shown during the game session. Importantly, cameras 305c, 310c, 315c, and 320c represent different media streams (e.g., various Points of View (POV) or viewing angles, etc.) of gameplay and can be viewed by subscribers to multi-user platform 125. The different media streams are assigned or mapped to respective display screens 305, 310, 315, and 320 in a digital or VR environment (discussed in greater detail below).

Figure 4:
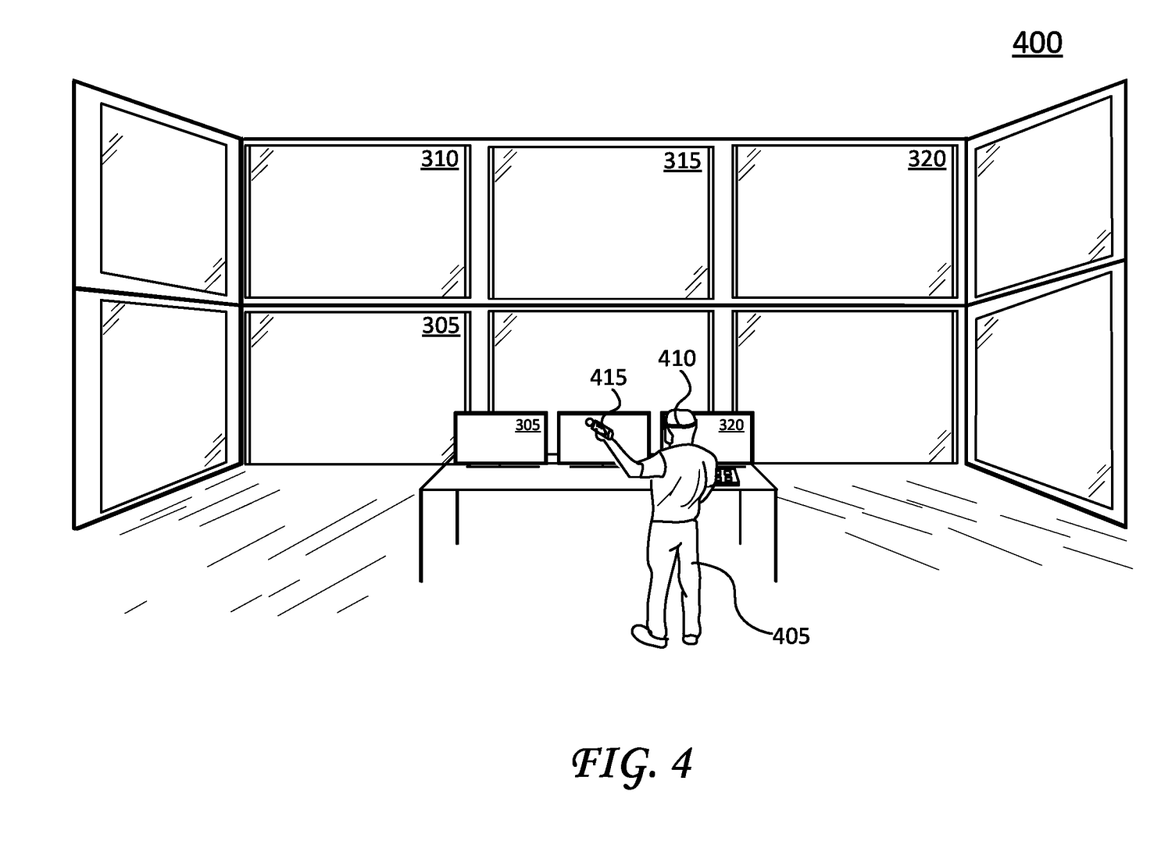
FIG. 4 illustrates a schematic diagram of a virtual reality (VR) environment, showing a commentator studio.

FIG. 4 illustrates a schematic diagram 400 of an exemplary VR environment, particularly showing a simulated commentary studio from a perspective of a user 405. User 405 experiences and interacts with the VR environment using a headset 410 and a controller 415. In operation, headset 410 and/or controller 415 may be wirelessly connected to additional components such as a network game system (discussed above) or, alternatively, headset 410 and controller 415 may be independently coupled to multi-user platform 125 over a network (e.g., network 105).

Headset 410 simulates the VR environment (e.g., the commentary studio) and displays or projects graphical elements to user 405, tracks eye movements, and measures biometric data, and the like. Controller 415, similar to headset 410, facilitates user interaction with and within the VR environment and is operable to, for example, detect, track, or otherwise monitor movement and biometric information, communicate data signals with headset 410 and the network game console, and provide feedback (e.g., tactile, audible, etc.) to a user 405. In this fashion, headset 410 and/or controller 415 can include any number of sensors, gyros, radios, processors, touch detectors, transmitters, receivers, feedback circuitry, and the like. Headset 410 and controller 415 (and any other supporting VR equipment such as network game system) cooperate to provide an immersive and interactive VR environment to user 405.

The VR environment shown here can include includes interactive graphical representation of video editing tools as well as a number of display screens showing gameplay content for game session 300. As mentioned above, the display screens, including display screen 305, display screen 310, display screen 315, and display screen 320, show different media streams, each corresponding to a respective POV or viewing angle that corresponds to camera 305c, camera 310c, camera 315c, camera 320c, respectively.

Figure 5:
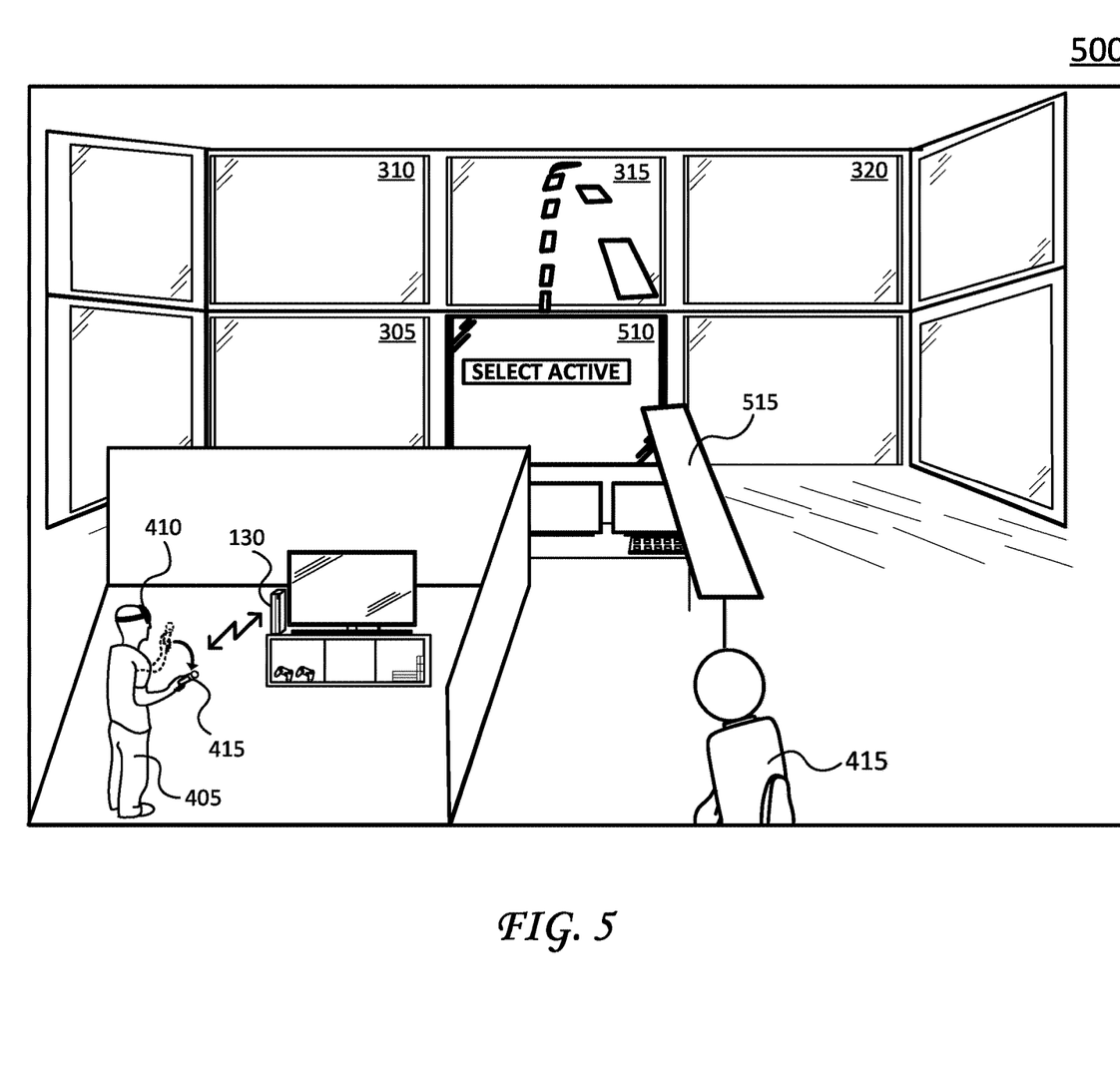
FIG. 5 illustrates a schematic diagram of the VR environment shown in FIG. 4, further showing one display screen selected as an active display screen.

FIG. 5 illustrates a schematic diagram 500 of the commentary studio of FIG. 4, further showing a display screen 510 selected as an active display screen. In some embodiments, user 405 moves controller 415 to indicate a selection operation. The network game system detects a change in controller orientation, direction, acceleration, or velocity, determines a corresponding path 515, and projects path 515 to headset 410. Path 515 intersects with display screen 510 and results in selection of display screen 510 (e.g., the graphical representation corresponding to display screen 510) as an active display screen or an active representation of gameplay content. Notably, in some embodiments, user 405 may provide additional inputs to select display screen 510 as the active display screen (e.g., button press, eye movement, eye hovering, etc.). As used herein, the terms "active display screen", "active media stream", and/or active representation" may be used interchangeable to refer to a selected display screen and/or media content corresponding to the selected display screen. In this fashion, selecting display screen 510 as the active display screen sets the media stream mapped to display screen 510 as an active media stream for a time period (e.g., when the user 405 provides commentary content corresponding to the active media stream).

In other embodiments, display screen 510 may be selected as the active display screen based on milestones (e.g., transitions or events) in the game session. For example, games can include milestones such as transitions to new levels, discovering new inventory, defeating bosses, interactions between players (e.g., defeats, victories, etc.), a number of points achieved, a likelihood of an event occurring, and the like. Some of these milestones may be set by a game design in advance, while others may be determined based on game statistics derived from iterations of the gameplay. These milestones may be used as a trigger to automatically select and set certain display screens as the active display screen when, for example, the display screen shows players in relative proximity to a milestone. The player's proximity or approach to the gameplay milestone can be determined based on character locations in the game environment (e.g., on a world map), proximity between character locations and the milestone location, players in relative proximity to each other (e.g., in a tournament style game), and the like. In this fashion, the character locations may be tracked during the course of the game session and trigger selection of a display screen as the active display screen.

Still referring to FIG. 5, user 405 operatively provides commentary content such as audio commentary, textual commentary, and/or visual commentary, for the gameplay in the game session. The VR environment—here, the commentary studio—provides an immersive experience to solicit commentary content and associate/map portions of the commentary content to the media stream displayed by the active display screen. The portions of the commentary content is further associated and synchronized with the media stream for the active display screen, and broadcast to subscribers of the multi-user platform. In addition to the display screens (which show various POVs/viewing angles of gameplay), the VR environment also provides a variety of editing interfaces or tools. User 405 can view various aspects of the gameplay over the plurality of display screens, select active display screens/active media streams for periods of time, edit portions of active media streams (corresponding to respective active display screens), and generally provide commentary content about the gameplay using controller 415, headset 410, or other input devices.

Figure 6:
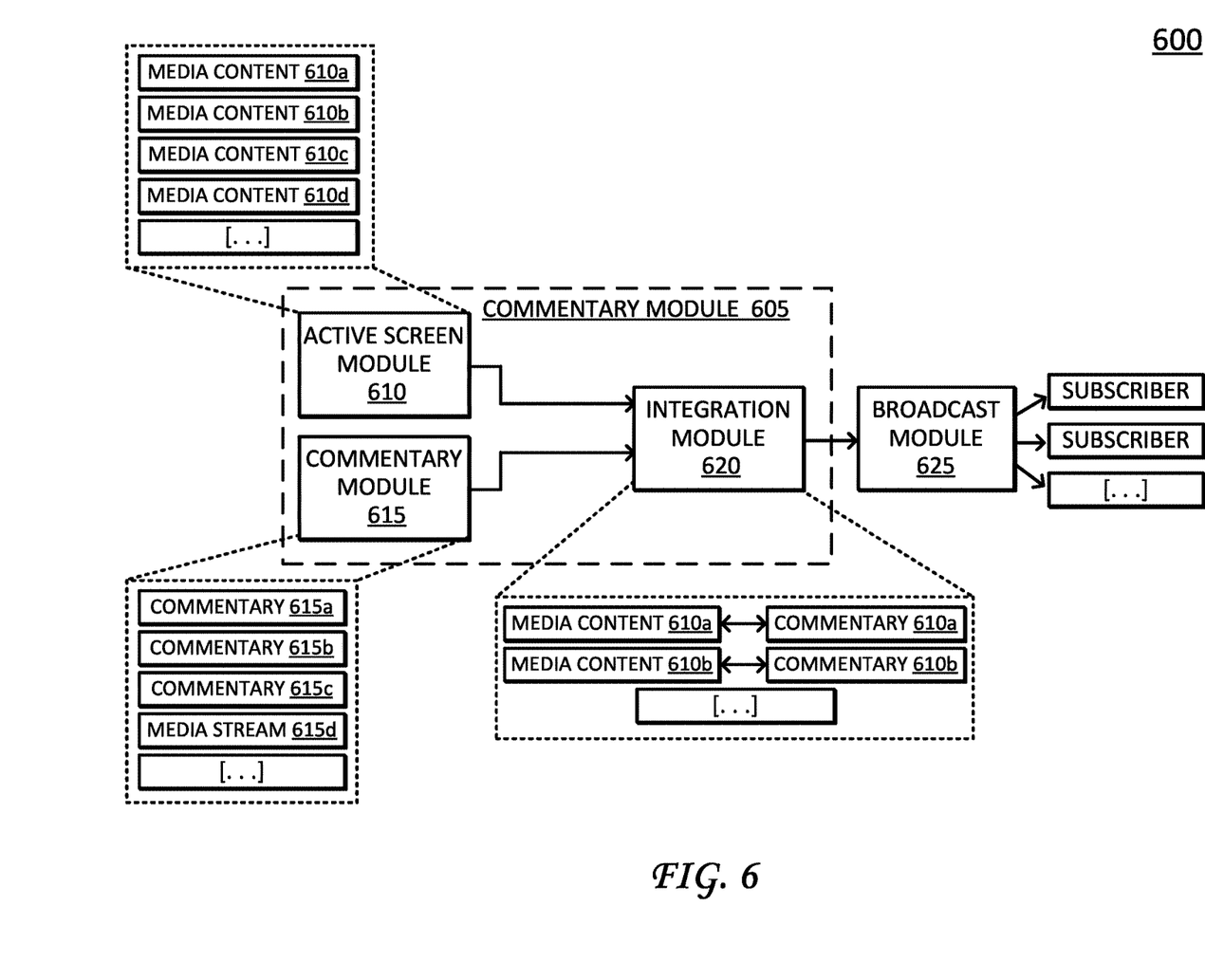
FIG. 6 illustrates a schematic diagram of a commentator module, which may be used in conjunction with the device shown in FIG. 2.

FIG. 6 illustrates a schematic diagram 600 of a commentary module 605. Commentary module includes an active screen module 610, a commentary module 615, and an integration module 620. In operation, commentary module 605 receives commentary content during a time period—e.g., commentary content 165a, 615b, 615c, 615d, and so on. Active screen module 610 monitors and identifies portions of active media streams for the same time period to create corresponding media content—e.g., media content 610a, media content 610b, media content 610c, media content 610d, and so on. Integration module 620 maps or associates the active media content with the commentary content based on the time period to synchronize the commentary content with the active media content. That is, user 405 selects an active display screen in the VR environment and provides commentary content corresponding to the active media stream associated with the active display screen. Commentary module 605, including sub-modules active screen module 610, commentary module 615, and integration module 620, collectively cooperate to receive the commentary content and synchronize the commentary content with portions of active media content (for an active media stream) to create synchronized content. The synchronized content is further passed to a broadcast module 625 for subsequent broadcast transmission to one or more subscribers to the multi-user platform. The synchronized content may include a commentary channel, which can provide commentary content and corresponding media content.

Commentary module 605 may represent components or modules of device 200 (and/or multi-user platform 125). For example, commentary module 605 may perform operations embodied by commentary process/services 244 to provide an immersive VR environment, intuitively present media streams (or portions thereof) as well as editing interfaces/tools, etc., map media content with commentary content, and synchronize such content for subsequent broadcast.

Figure 7A:
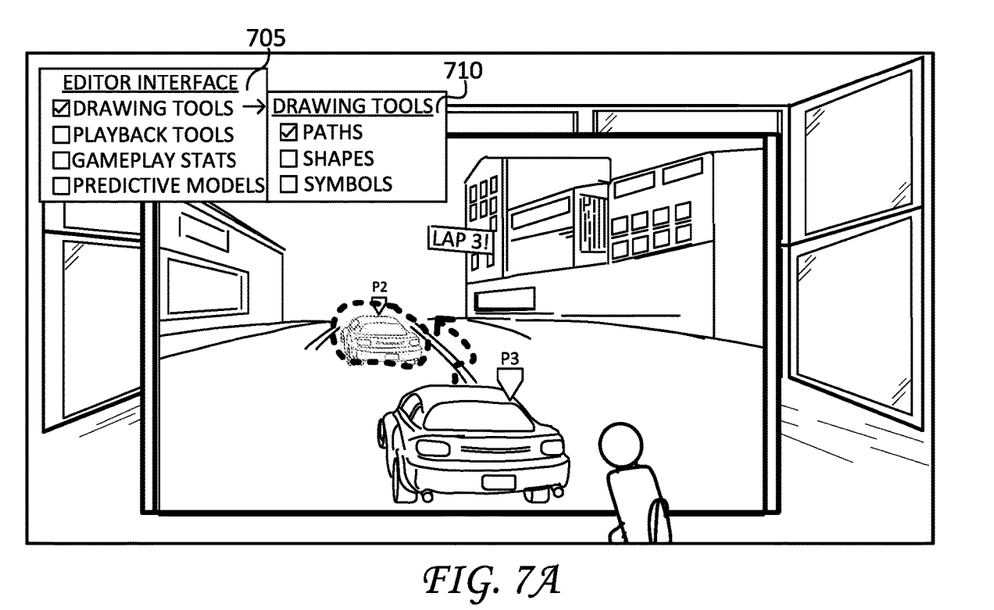
FIGS. 7A, 7B, 7C, and 7D illustrates a schematic diagram of the VR environment shown in FIG. 4, further showing an editing interface of various editing tools.
Figure 7B:
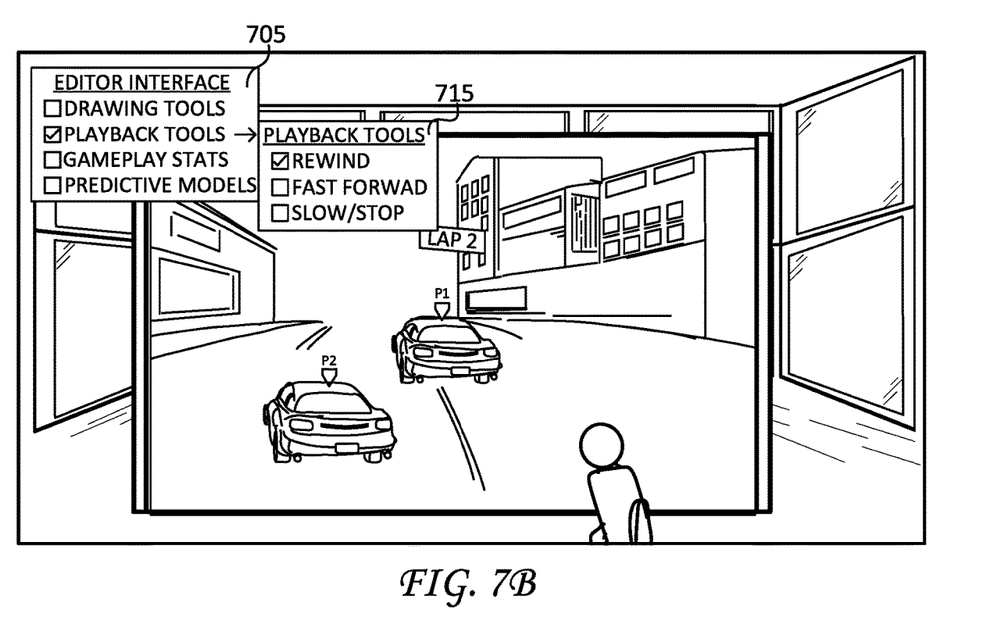

FIGS. 7A, 7B, 7C, and 7D illustrate schematic diagrams of the VR environment, particularly showing an editing interface 705. The editing interface provides various editing tools that allow user 405 to generally edit (e.g., mark-up, sketch over, rewind, set playback options, overlay gameplay statistics, predict player or gameplay behaviors, etc.) portions of media streams displayed by an active display screen to create modified media content. For example, FIG. 7A shows a drawing tools interface 710 that allows a user to create paths, shapes, symbols, and the like, as an overlay to the portion of media stream displayed by the active display screen. Here, the "paths" tool is selected and user 405 creates a route or path highlighting a potential move by player 3 (P3) to pass player 2 (P2). FIG. 7B shows a playback tools interface 715, which manipulates playback time of the portion of the media stream—e.g., rewind, fast forward, slow motion, stop, replay, etc.

Figure 7C:
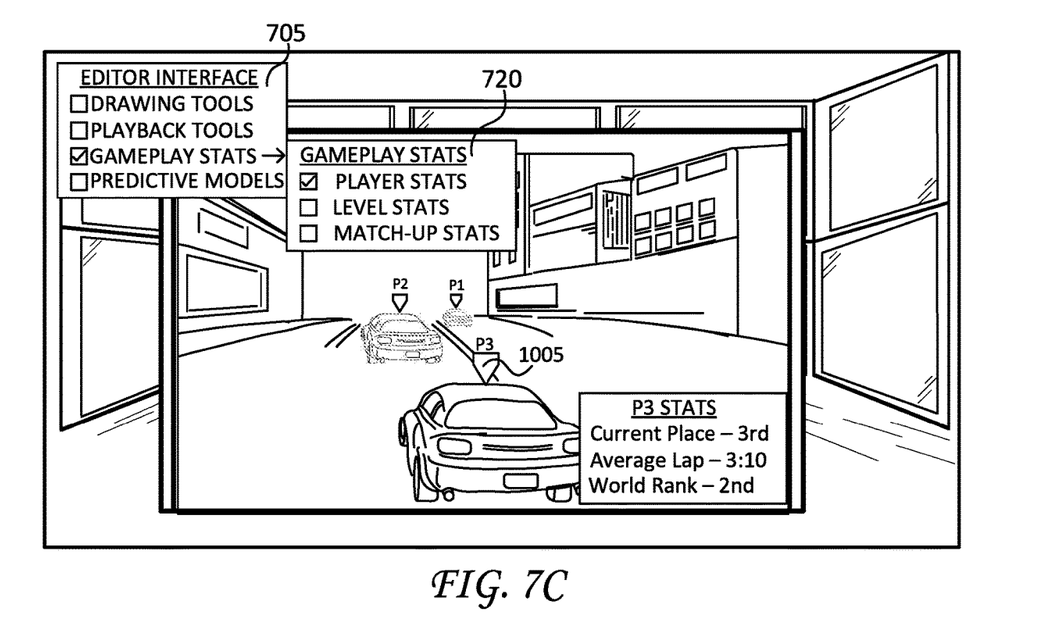
Figure 7D:
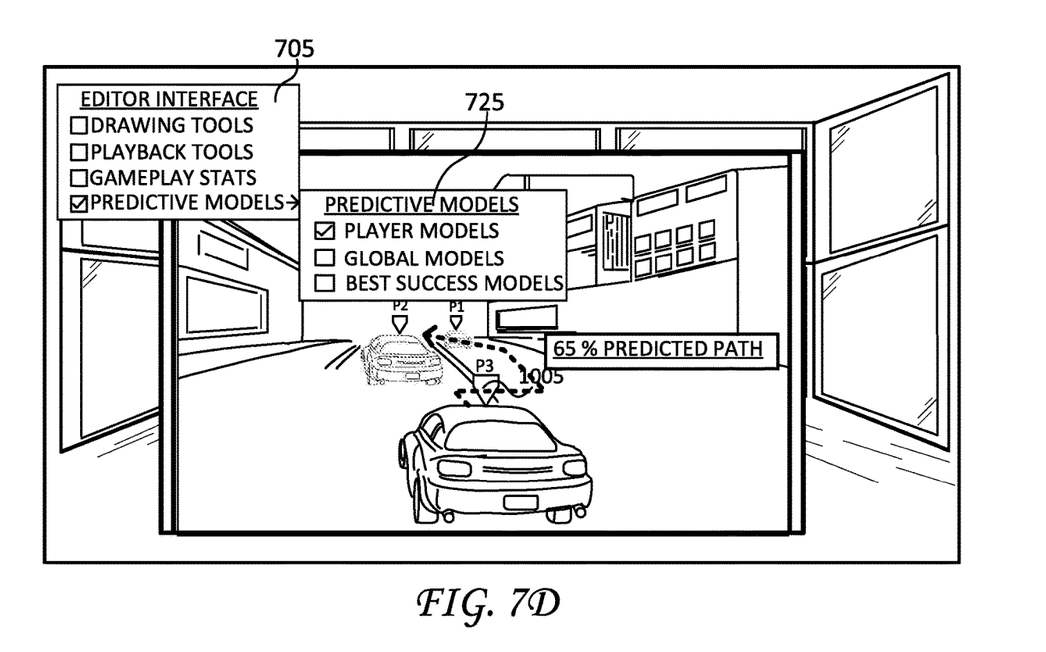

FIG. 7C shows a gameplay stats interface 720 that allows user 405 to select and overlay various gameplay statistics over the portion of the media stream. These gameplay stats can include any number of statistics such as play specific statistics, level statistics, match-up statistics between one or more players, and the like. FIG. 7D shows a predictive model interface 725 that allows a user to select and overlay predictive behaviors over the portion of the media stream. The predictive model may be determined based on prior iterations of gameplay for a specific player, for a particular game, and so on.

It is appreciated that the editing interface 705 shown by 7A, 7B, 7C, and 7D provides a variety of editing options to user 405 and that the illustrated options or tools are provided for purposes of illustration, not limitation. Editing interface 705 can include (or exclude) any number of editing tools as desired. Editing interface 705 provides intuitive tools that can enhance or supplement commentary content. In this fashion, a user can manipulate, enhance, or otherwise modify portions of media streams to create modified media content. This modified content may be included as part of the commentary content, which can be broadcast to subscribers of the multi-user platform, discussed above.

Figure 8:
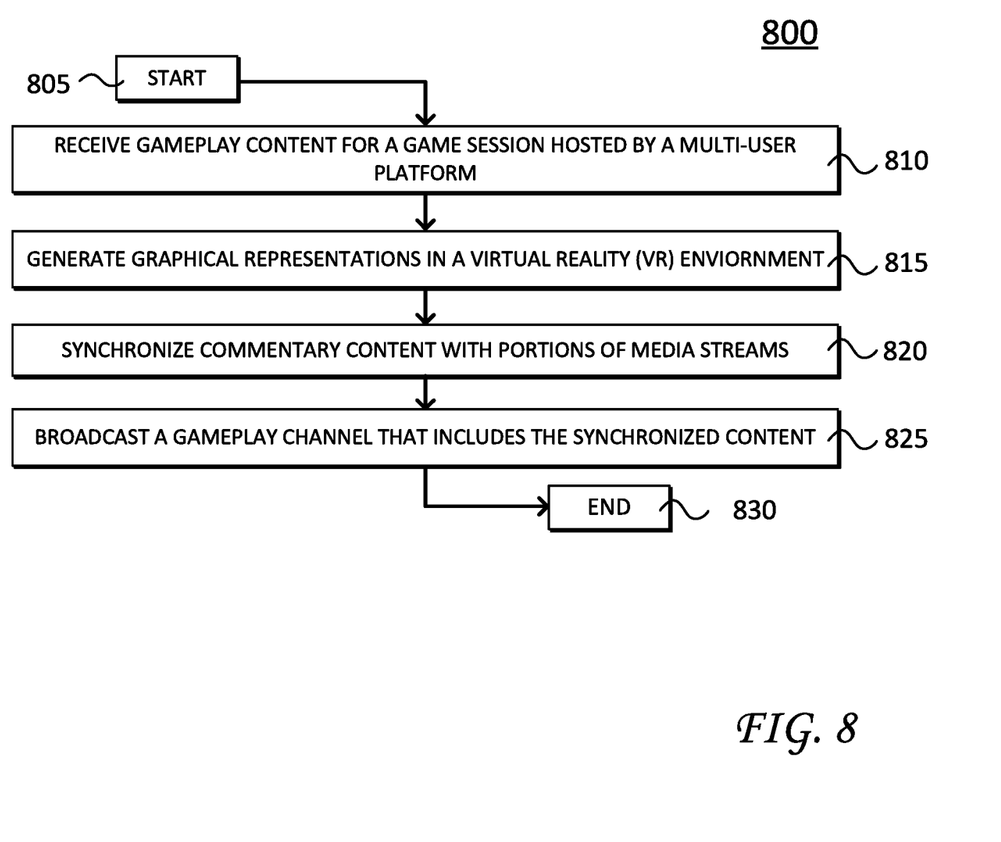
FIG. 8 illustrates an example simplified procedure for providing commentary related to gameplay.

FIG. 8 illustrates an example simplified procedure 800 for providing commentary related to gameplay, particularly from the perspective of device 200, commentary module 605 and/or multi-user platform 125 (or components thereof). For purposes of discussion below, reference is made to a multi-user platform.

Procedure 800 begins at step 805 and continues to steps 810, where the multi-user platform receives gameplay content for a game session. For example, the multi-user platform can host and provide game content to its subscribers. The subscribers interact with the game content and generate gameplay content for a game session. The multi-user platform receives such gameplay content and can further provide a virtual reality (VR) environment to a user. The VR environment can, for example, include the above discussed commentary studio with graphical representations of media streams related to the gameplay, as shown in step 815. For example, a media stream for a particular POV/viewing angle may be represented by a graphical representation of a display screen (e.g., display screen 305, 310, 315, 320, etc.) In addition, the VR environment can provide editing interfaces that allow a user to manipulate media content shown by the display screens. These editing interfaces can overlay various types of graphics, information, playback options, statistics, and the like.

As discussed above, the VR environment provides an immersive experience to solicit user commentary related to gameplay content—here, the user can select a particular display screen as an active display screen, provide commentary content regarding portions of a media stream displayed by the active representation/active display screen. This commentary content can include audio content, visual content, textual content, and the like. In this fashion, the commentary content can include audio commentary from the user as well as a graphics, playback options, gameplay statistics, overlays, and so on. Notably, in some embodiments, the multi-user platform may automatically set certain display screens as active based on gameplay milestones (discussed above).

The multi-user platform further synchronizes, at step 820, the commentary content received in a time period with portions of a media stream that correspond to an active display screen for the time period to create synchronized content. For example, the multi-user platform determines a time period for portions of the commentary content and selects a graphical representation in the VR environment as an active representation (e.g., an active display screen) for the time period. The multi-user platform further parses portion of a media stream associated with the active representation for the time period and associates or maps the portion of the media stream with the commentary content. Notably, in some embodiments, the commentary content includes gameplay statistics (gameplay stats 720), playback modifications (playback tools 715), graphical overlays (e.g., drawing tools 710, predictive models 725), and the like.

The multi-user platform broadcasts, at step 825, the synchronized content to its subscribers. In some embodiments, the synchronized content may be broadcast in conjunction with real-time gameplay on a delay, or a time after the game session ends.

Procedure 800 subsequently ends at step 830, but may begin again at step 810 where the multi-user platform receives gameplay content for the game session. Collectively, the steps in procedure 800 describe a process to provide commentary content in conjunction with gameplay content. It should be noted that certain steps within procedures 800 may be optional, and further, the steps shown in FIG. 8 are merely examples for illustration. Certain other steps may be included or excluded as desired. Further, while a particular order of the steps is shown and executed from the perspective of a particular device or system, this ordering is merely illustrative, and any suitable arrangement of the steps and/or any number of systems, platforms, or devices may be utilized without departing from the scope of the embodiments herein.

The techniques described herein, therefore, provide interactive commentary processes that combine an immersive simulated VR environment with gameplay content for a game session. These interactive commentary processes define simple and intuitive techniques to enhance spectator participation as well as spectator enjoyment.

While there have been shown and described illustrative embodiments of the commentary processes for VR environments (e.g., a commentary studio), it is to be understood that various other adaptations and modifications may be made within the spirit and scope of the embodiments herein. For example, the embodiments and certain functionality have been shown and described herein with relation to certain systems, platforms, hardware, devices, and modules. However, the embodiments in their broader sense are not as limited, and may, in fact, be employed in non-VR environments as well as employed by any combination of the devices or components discussed herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for gameplay view selection for commentary, the method comprising:
   storing information regarding one or more milestone events defined for a game title;
   receiving a plurality of different media streams that correspond to a plurality of in-game views of a game session of the game title;
   identifying one of the in-game views of at least one of the media streams that corresponds to one or more of the milestone events, wherein the one or more of the milestone events include in-game events completed based on in-game actions by user-controlled characters;
   selecting the at least one identified media stream to include in an active display;
   receiving commentary content that corresponds to the active display during a time period;
   synchronizing the commentary content as received relative to the time period of the at least one identified media stream; and
   distributing the synchronized content via a gameplay channel accessible to one or more subscriber devices.

2. The method of claim 1, wherein the one or more milestone events include transition to a new level within the game title, interaction between players within the game title, or a predetermined amount of points achieved within the game title.

3. The method of claim 1, wherein the one or more milestones are determined based on one or more game statistics from gameplay of the game title.

4. The method of claim 1, wherein the one or more milestones are set in advance of gameplay of the game title.

5. The method of claim 1, wherein the at least one identified media stream is identified based on a character location, proximity between the character location and a milestone location, or proximity between players.

6. The method of claim 1, further comprising distributing the plurality of different media streams on a plurality of respective display screens.

7. The method of claim 1, wherein one or more portions of the active display is modified using an editing interface to create modified media content.

8. The method of claim 1, wherein one or more portions of the active display is modified using a drawing interface to create one or more paths, shapes, or symbols, wherein the paths indicate a potential move by a player in the game title.

9. A system for gameplay view selection for commentary, the system comprising:
a network interface to communicate in a communication network, wherein the network interface:
receives a plurality of different media streams that correspond to a plurality of in-game views of a game session of a game title, and
receives commentary content that corresponds to an active display during a time period; and
a processor that executes instructions stored in memory, wherein execution of the instructions by the processor:
identifies one of the in-game views of at least one of the media streams corresponds to one or more milestone events defined for the game title, wherein information regarding the one or more milestone events is stored in the memory, and wherein the one or more of the milestone events are in-game events completed based on in-game actions by user-controlled characters,
selects the at least one identified media stream to include in the active display, and
synchronizes the commentary content as received relative to the time period of the at least one identified media stream;
wherein the network interface distributes the synchronized content via a gameplay channel accessible to one or more subscriber devices.

10. The system of claim 9, wherein the one or more milestone events include transition to a new level within the game title, interaction between players within the game title, or a predetermined amount of points achieved within the game title.

11. The system of claim 9, wherein the one or more milestones are determined based on one or more game statistics from gameplay of the game title.

12. The system of claim 9, wherein the one or more milestones are set in advance of gameplay of the game title.

13. The system of claim 9, wherein the at least one identified media stream is identified based on a character location, proximity between the character location and a milestone location, or proximity between players.

14. The system of claim 9, further comprising distributing the plurality of different media streams on a plurality of respective display screens.

15. The system of claim 9, wherein one or more portions of the active display is modified using an editing interface to create modified media content.

16. The system of claim 9, wherein one or more portions of the active display is modified using a drawing interface to create one or more paths, shapes, or symbols, wherein the paths indicate a potential move by a player in the game title.

17. A non-transitory computer-readable storage medium having software encoded thereon, the software executable by a processor to perform a method for gameplay view selection for commentary, the method comprising:
storing information regarding one or more milestone events defined for a game title;
receiving a plurality of different media streams that correspond to a plurality of in-game views of a game session of the game title;
identifying one of the in-game views of at least one of the media streams that corresponds to one or more of the milestone events, wherein the one or more of the milestone events are in-game events completed based on in-game actions by user-controlled characters;
selecting the at least one identified media stream to include in an active display;
receiving commentary content that corresponds to the active display during a time period;
synchronizing the commentary content as received relative to the time period of the at least one identified media stream; and
distributing the synchronized content via a gameplay channel accessible to one or more subscriber devices.

18. The method of claim 1, further comprising displaying the plurality of in-game views in a virtual reality (VR) environment simulating a commentary studio, wherein the commentary content is received through a user interacting with the VR environment.

* * * * *